Dec. 8, 1931.  F. A. GROUNDS  1,835,214
EXCAVATING SCOOP AND SCRAPER
Original Filed Dec. 6, 1929  4 Sheets-Sheet 1
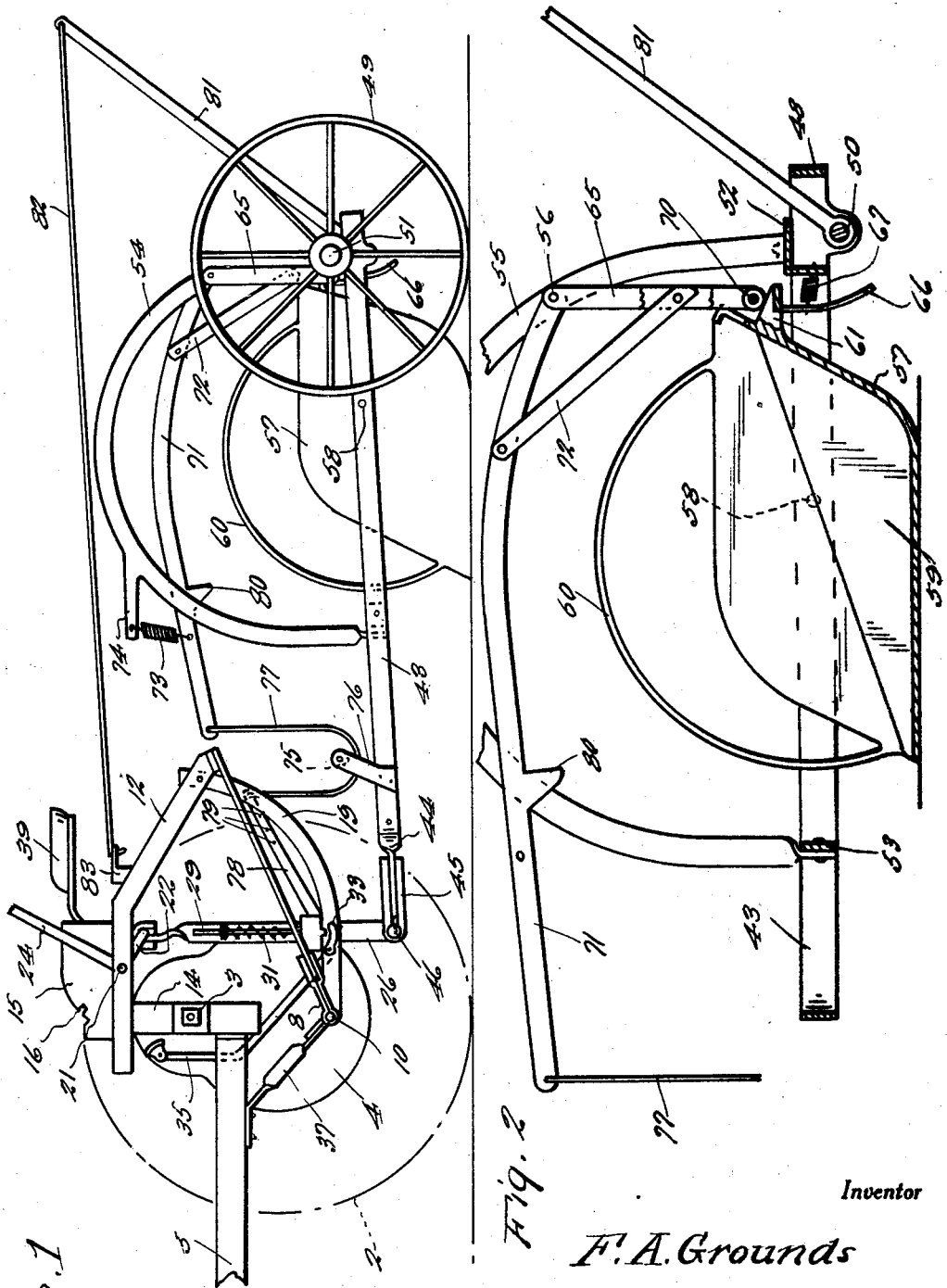
Inventor
*F. A. Grounds*
By *Clarence A. O'Brien*
Attorney Dec. 8, 1931.  F. A. GROUNDS  1,835,214
EXCAVATING SCOOP AND SCRAPER
Original Filed Dec. 6, 1929  4 Sheets-Sheet 2

Inventor
F. A. Grounds
By Clarence A. O'Brien
Attorney

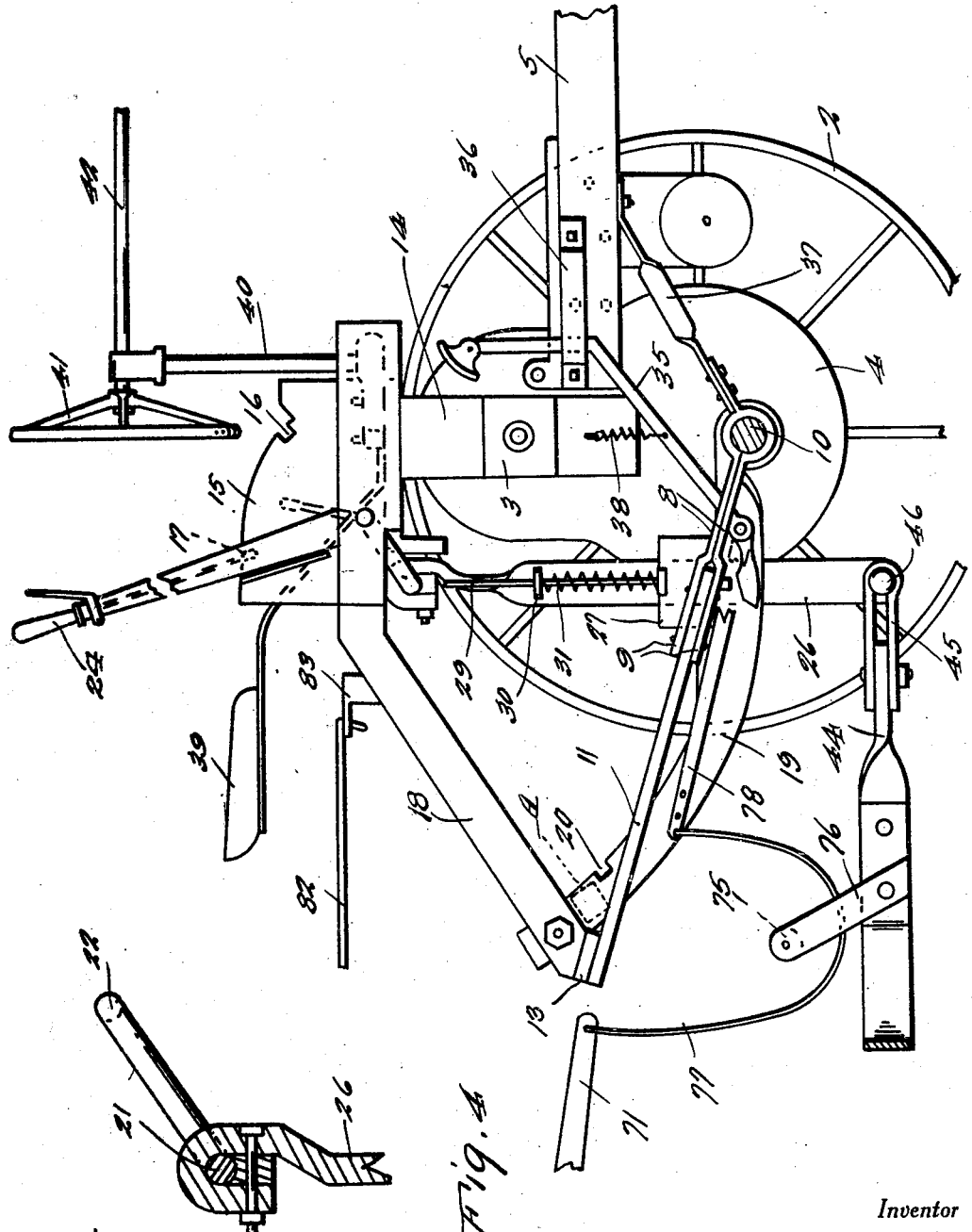

Dec. 8, 1931.  F. A. GROUNDS  1,835,214
EXCAVATING SCOOP AND SCRAPER
Original Filed Dec. 6, 1929   4 Sheets-Sheet 4
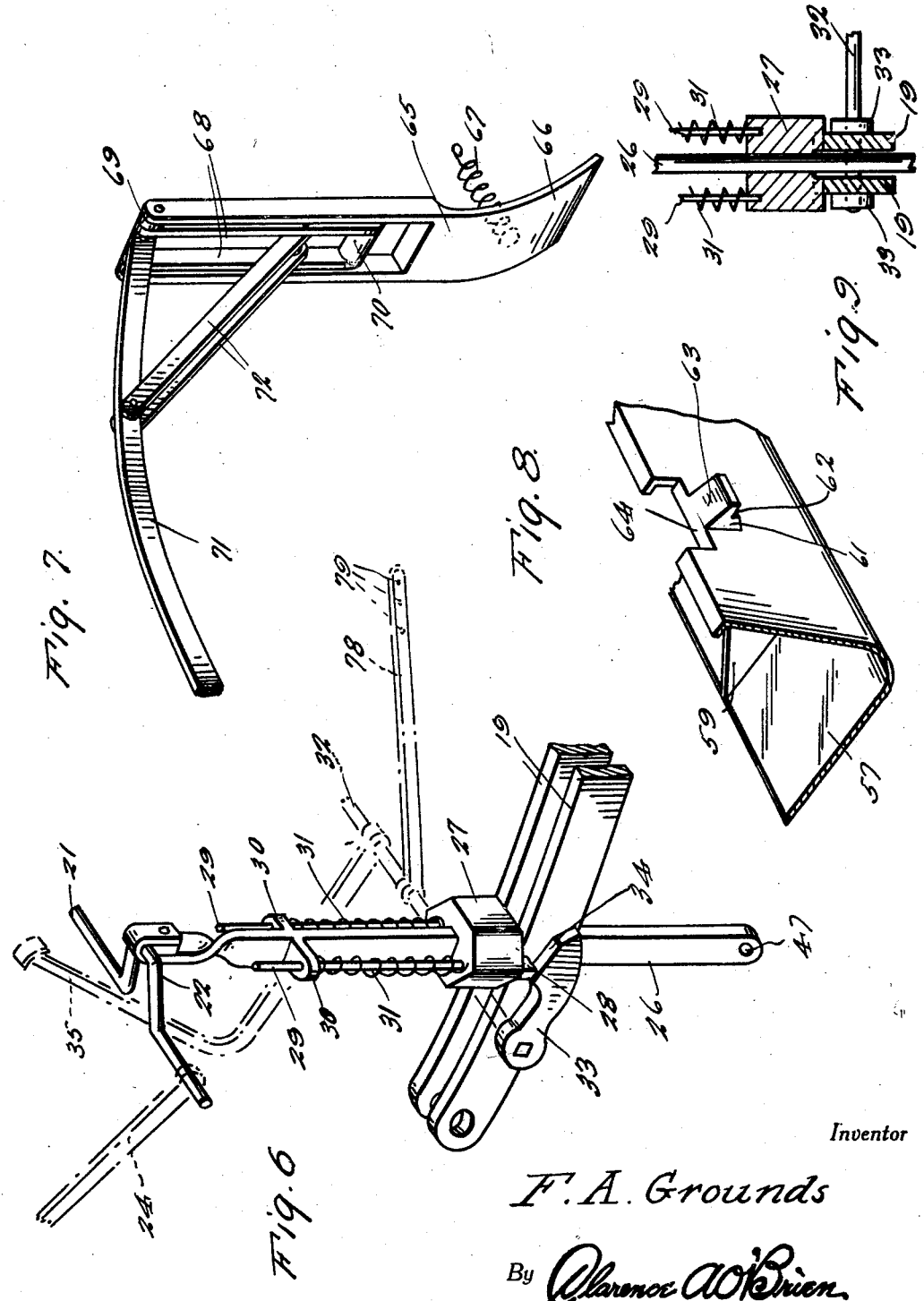
Inventor
*F. A. Grounds*
By *Clarence A. O'Brien*
Attorney Patented Dec. 8, 1931

1,835,214

UNITED STATES PATENT OFFICE

FRED A. GROUNDS, OF SHREVEPORT, LOUISIANA, ASSIGNOR OF FORTY PER CENT TO JAMES B. BEAIRD, OF SHREVEPORT, LOUISIANA, AND FIFTY-FIVE PER CENT TO COMMERCIAL NATIONAL BANK OF SHREVEPORT, LOUISIANA, OF SHREVEPORT, LOUISIANA, A CORPORATION

EXCAVATING SCOOP AND SCRAPER

Application filed December 6, 1929, Serial No. 412,127. Renewed March 28, 1931.

This invention relates to an excavating scoop and scraper and more particularly to devices of this character which are adapted to be attached to a tractor for drawing the same over the ground but it is to be understood that an implement in accordance with this invention may be attached to any draft implement or machine for which the same is found adapted.

One of the important objects of the invention is to provide an excavating scoop and scraper embodying a novel construction and arrangement whereby the tractor or other vehicle is relieved from pulling the load for a brief period of time when the scoop has reached its load capacity, said tractor moving forward and gaining new traction and momentum to assist in drawing the full load.

An important object of the invention is to provide, in a manner as hereinafter set forth, an excavating scoop and scraper of the aforementioned character having means embodied therein whereby the scoop will be elevated to a position above the ground after said scoop is loaded by the draft force of the tractor exerted on the implement.

Another important object of the invention is to provide, in a manner as hereinafter set forth, an implement of the aforementioned character which is adapted to function as a scraper to level the pile of dirt which is dumped therefrom when the device is in operation.

A further object of the invention is to provide manually operable means whereby a single operator may control the tractor and the several operations which the implement performs, such as loading, elevating, dumping and scraping.

Other objects of the invention are to provide an implement of the character set forth which will be simple in construction, strong, durable, efficient in its use and which may be manufactured at low cost.

Other objects and advantages of the invention will become apparent from a study of the following specification, taken in connection with the accompanying drawings wherein like characters of reference designate corresponding parts throughout the several views and wherein:—

Figure 1 is a view in side elevation of an implement constructed in accordance with this invention, the same being shown attached to the rear end of a tractor.

Figure 2 is a longitudinal sectional view showing the scoop supporting frame with the scoop pivotally mounted therein and the control means for said scoop.

Figure 4 is a view in side elevation showing the means of attaching the device to the tractor and the manually actuated control means for the scoop.

Figure 5 is a fragmentary view in section showing the connection between the connecting link and the actuating crank therefor.

Figure 6 is a detail view in perspective showing the swingable hitch link and the latching means therefor.

Figure 7 is an enlarged detail view in perspective showing the scoop retaining means.

Figure 8 is a detail view in perspective of the central portion of the scoop, the same being shown in section on one end and broken away on the other end.

Figure 9 is a fragmentary detail view in section of the latch and actuating means therefor, which are associated with the swingable hitch link.

Figure 3:
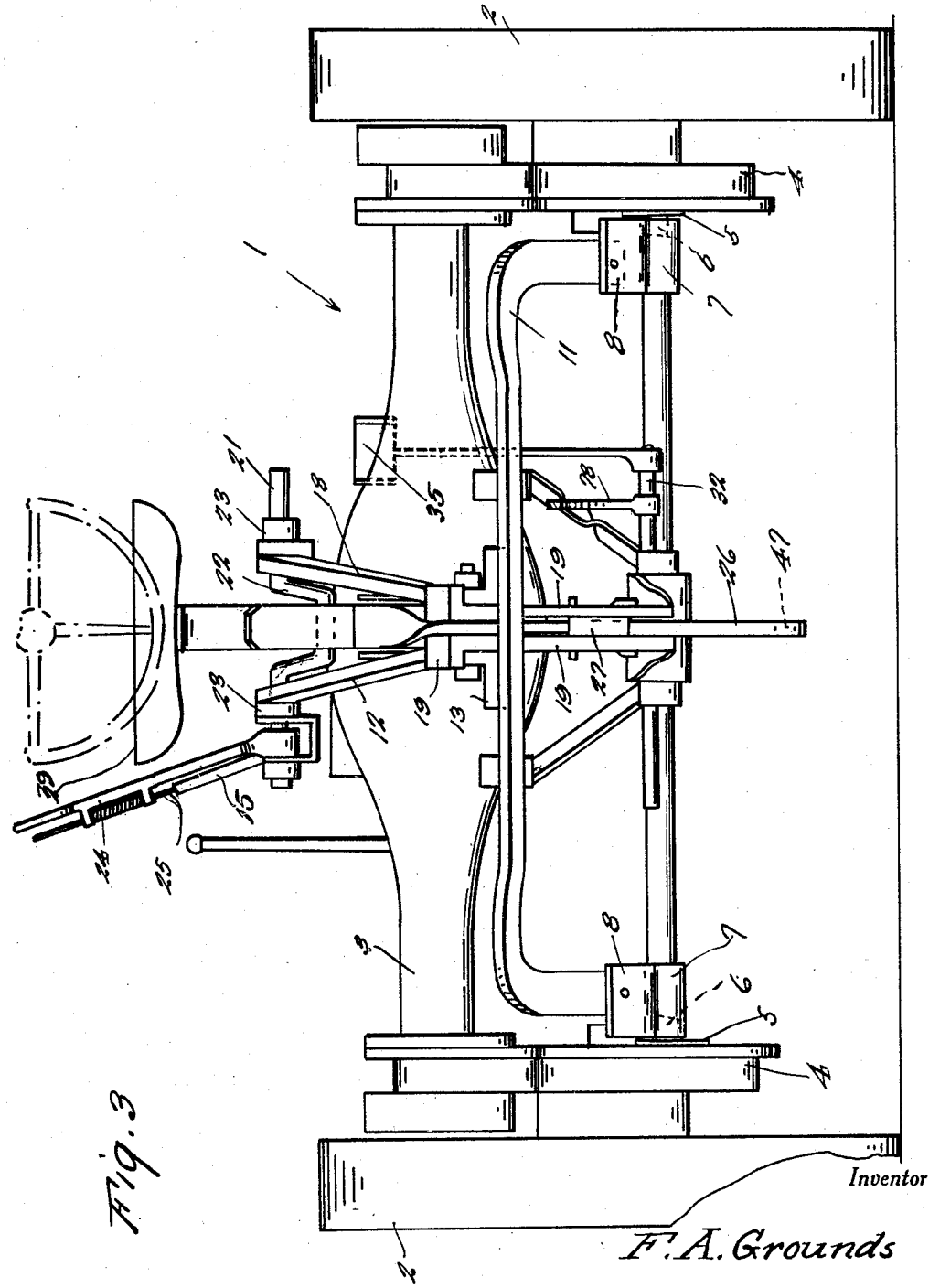
Figure 3 is a view in rear elevation showing the means of attaching the device to the tractor.

Referring to the drawings in detail, the reference character 1 designates generally the rear construction of a tractor including the drive wheels 2 upon which are mounted the axle and differential housings 3 which are operatively connected to said rear wheels through the medium of conventional gearing in the housing 4—4. The tractor further includes a longitudinally extending beam or bar 5.

The inner sides of the gear housings 4 have rigidly mounted thereon a pair of plates 5 upon which are mounted the inwardly extending trunnions 6 upon which are journaled the sleeves 7 having the integral lateral extension 8 thereon. As best illustrated in Figure 5 of the drawings, the sleeves 7 are split and the opposite ends which comprise the extension 8 project therefrom and have their end portions spaced from each other for a purpose which will be hereinafter more fully set forth. The spaced end portions of the extension 8 are designated by the reference numeral 9. A horizontally disposed transverse shaft 10 has its opposite ends supported in the inner portions of the sleeves 7. A substantially U-shaped supporting means 11 has its opposite ends fixed between the spaced end portions 9 of the extensions 8 and extends outwardly and rearwardly therefrom. An upwardly and forwardly extending bar 12 has its rear end fixed on the intermediate portion of the frame member 11, as at 13, and the forward end portion of the bar 12 extends in a horizontal plane above the housing 3 and is supported thereon through the medium of a suitable support 14. The bar 12 has fixed on its horizontally disposed upper end portion a segmental keeper plate 15 having the notches 16 and 17 in its opposite end portions. A second bar 18 is mounted, at its lower end, on an intermediate portion of the element 11 in spaced relation to the adjacent end portion of the bar 12 and extends downwardly above the differential housing 3. As best illustrated in Figure 3 of the drawings, the bars 12 and 18 have their inclined portions extending in diverging relation with respect to each other and said bar 18 is provided with a horizontally disposed free end portion which parallels the corresponding portion of the bar 12.

A pair of spaced parallel arcuate guide bars 19 have one end supported on the intermediate portion of the shaft 10 and extend rearwardly therefrom and have their rear ends supported on the inner sides of the lower end portions of the bars 12 and 18, as best seen in Figure 3. The guide bars 19 are provided with pairs of notches or recesses 20 adjacent their opposite ends and a fulcrum block A is adjustably mounted between said bars just above the uppermost recesses for a purpose which will be presently set forth. A crank shaft 21 has its opposite end portions journaled through the horizontally disposed portions of the bars 12 and 18 and said end portions of the crank shaft project laterally from said bars as seen in Figure 3. The crank portion 22 of the shaft 21 is disposed between the bars 12 and 18 and retaining collars 23 are fixed on the shaft for retaining the same in proper position on the bars. A hand lever 24 is fixed on one end portion of the crank shaft 21 adjacent the keeper plate 15 and has mounted thereon a spring controlled latch 25 adapted to be selectively engaged in the notches 16 and 17 for retaining the lever in adjusted position.

As best illustrated in Figures 5 and 6, the crank portion 22 of the crank shaft 21 has hingedly connected thereto and depending therefrom the swingable hitch link 26 which has its lower end portion slidably disposed between the guide bars 19 and terminates at a point therebelow. A latch block 27 is slidably mounted on the hitch link 26 above the guide bars 19 and is provided on its lower end with lugs or protuberances 28 adapted to engage in the notches or recesses 20 in said guide bars for retaining said hitch link in the desired position. Pins 29 are mounted on the upper side of the latch block 27 on opposite sides of the hitch link 26 and slidably through the perforated lugs 30 which extend laterally from the upper end portion of said hitch link. Expansible coil springs 31 encircle the pins 29 and have their upper and lower ends impinged against the lugs 30 and the latch block 27 respectively for maintaining said latch block in engagement with the upper edges of the guide bars 19.

A horizontally disposed shaft 32 is journalled for support through the guide bars 19 adjacent the forward ends thereof and has fixed thereon, adjacent the outer side of the guide bars, a pair of latch actuating arms 33 having the inclined latch engaging cam surfaces 34 on the upper edges thereof adjacent their free ends. A foot actuated lever 35 is fixed on the shaft 32 for manually rocking said shaft in the guide bars 19 and swinging the arms 33 in a manner to lift the latch block 27 on the hitch link 26 against the tension of the coil springs 31. The foot lever 35 extends upwardly and forwardly beneath the differential housing 3 of the tractor and terminates in a vertically disposed portion which extends through a guide plate 36 mounted on the rear end portion of the beam or bar 5, as best illustrated in Figure 4. It may be well to here mention that inclined braces 37 have one end fixed to the underside of the beam 5 and their opposite ends attached to the shaft 10 for lending lateral support to said shaft. The foot pedal 35 is normally maintained in raised position through the medium of the pull string 38 which is secured to an intermediate portion thereof and to any suitable point on the tractor or implement frame. A seat 39 is mounted at any convenient point on the tractor or the implement frame as is also the vertical standard 40 which supports the steering wheel 41 on the shaft 42. A rearwardly extending substantially U-shaped frame 43 is provided, at its forward end, with an extension 44 (see Figure 4) to which is bolted the coupling element 45 which is substantially U-shaped. The opposite end portions of the coupling 45 embrace the free end portion of the extension 44 and are bolted thereto and the closed end of said element is pivotally connected to the lower end of the hitch link 26 through the medium of the pivot pin 46 which extends therethrough and is anchored in the hole 47 adjacent the lower end of said hitch link. The pivot pin 46 has its free end provided with a head for retaining the coupling element 45 in position thereon. As best illustrated in Figure 2 of the drawings, the rear end of the frame includes a transverse end bar 48 and said rear end is supported on the wheels 49 through the medium of the axle 50 which is journaled through the side bars of the frame adjacent the rear end thereof and has laterally offset spindles 51 upon which said wheels 49 are mounted for rotation. An angle bar 52 has its opposite ends supported on the longitudinal side bars of the frame 43 adjacent their rear ends and another transversely extending horizontally disposed bar 53 extends between said side members adjacent the forward end of the frame. A pair of longitudinally extending substantially U-shaped bars 54 and 55 have their rearward and forward ends supported on intermediate portions of the angle bar 52 and the cross bar 53, respectively, and said bars 54 and 55 extend in spaced parallel relation with respect to each other. A pivot shaft 56 extends between the bars 54 and 55 adjacent the rear ends thereof and at a point above the horizontal plane of the frame 43, as clearly indicated in Figure 2 of the drawings. The purpose of the bars 54 and 55 as well as the pivot pin 56 will be presently set forth.

A scoop 57 is pivotally supported between the opposite sides of the frame 43 at a point intermediate the bars 52 and 53, as indicated at 58. The scoop 57 is provided with the longitudinally extending reinforcing ribs or webs 59 and said scoop is further provided, on its opposite sides, with the arcuate runners 60 which have their forward ends anchored to the side walls of the scoop adjacent the bottom thereof and have their rear ends anchored to said side walls at the top edge thereof and adjacent the rear. The rear wall of the scoop is provided with a rearwardly extending retaining lug or extension 61 having a horizontally disposed flat lower side portion (see Figure 8) designated by the reference numeral 62 and an inclined upper surface 63. The portion of the rear wall of the scoop immediately above the retaining lug 61 is recessed, as at 64. A scoop supporting hanger 65 of substantially U-shaped configuration has the free end of its legs pivotally mounted on the pivot pin 56 between the bars 54 and 55 from which pivot pin the supporting hanger depends. The hanger 65 is provided with a downwardly and rearwardly curved extension 66 and an expansion spring 67 has one end impinged on the rear face of said extension 66 and its opposite end impinged on the vertically disposed portion of the angle bar 52 for normally urging the hanger forwardly. The connecting portion of the hanger 65 is adapted to engage with the flat under surface 62 of the extension 61 in a manner to support the scoop 57 in a horizontal plane. A pair of depending links 68 are pivotally suspended from the pivot pin 56 between the legs of the supporting hanger 65 and are spaced inwardly from said legs by the washers 69. As best seen in Figure 7, the links 68 are of less length than the legs of the hanger 65 and have journalled between their lower end portions a roller 70 which is adapted for engagement with the inclined surface 63 of the element 61 in a manner to co-act with said hanger 65 to maintain the scoop in a horizontal plane and prevent the rear end thereof from swinging upwardly. A forwardly extending curved lever 71 has its rear end pivotally supported on the pivot pin 56 between the links 68 and said lever extends forwardly therefrom to a point adjacent the transverse portion of the frame element 11. The lever 71 is operatively connected to each of the links 68 through the medium of the bars 72, as seen in Figure 7. The forward end portion of the lever 71 intersects the bars 54 and 55 and is normally maintained in raised position through the medium of a pull spring 73 which has one end supported on an arm 74 of the bar 54 and its opposite end connected to said lever. A pulley 75 is journaled on the free end of an upwardly inclined supporting bracket 76 on the forward end of the frame 43 and the cable 77 is trained under said pulley and has one end connected to the free end of the lever 71 and its other end connected to an arm 78 which is fixed on the shaft 32 and extends rearwardly and upwardly therefrom. The free end portion of the arm 78 is provided with a series of holes 79 in which the adjacent end of the cable 77 is adapted to be selectively engaged. The lever 71 is provided with a depending scoop engaging lug 80, the function of which will be more fully hereinafter set forth. A rearwardly inclined lever 81 is fixed to an intermediate portion of the rear axle 50 and a rod 82 is connected to the upper end of said lever 81 and extends forwardly and is anchored to a bracket 83 on the bar 12.

The operation of the invention is as follows:—

With the parts in the position indicated in the drawings, the tractor and implement are moved forward until the scoop is loaded and while still traveling forwardly, the operator presses the lever 35 downwardly in a manner to rock the shaft 32 and lift the latch block 27 upwardly against the tension of the coil springs 31 through the medium of the arm 33 until the lugs 28 thereon clear the notches 20 adjacent the lower end of the guide bars 19. The forward pull of the tractor will then cause the hitch link 26 to swing rearwardly on the crank shaft 21 as the tractor draws away from the frame 43, said frame pivoting on the lower end of the link 26. This movement continues until the latch block 27 engages in the notches 20 in the rear upper ends of the guide bars 19 at which point the angle between the hitch link 26 and the frame 43 will be materially decreased and, as will be apparent, the forward end of the frame 43 will have been elevated. The latch block 27 serves to maintain the hitch link 26 and said frame 43 in this elevated position. When the tractor draws away from the frame 43, the crank axle 50 is rocked in said frame 43 through the medium of the lever 81 and the rod 82 in a manner to elevate the rear end of the frame and the scoop 57 will be thus raised from the ground and the machine is then drawn to the point at which it is to be unloaded. When the tractor draws away from the frame 43, as before described, the bracket 76 thereon has been shifted with said frame in a manner to take all the slack out of the cable 77. It is understood that the slack in the cable 77 permits the initial rocking movement of the shaft 32 for disengaging the latch block 27 from the notches in the lower end of the guide bars 19.

When the point of unloading is reached, the operator again rocks the shaft 32 through the medium of the foot pedal 35 and the arm 78 is swung upwardly for the purpose of swinging the lever 71 downwardly through the medium of the cable 77, as will be obvious. The downward movement of the lever 71 swings the links 68 and the roller 70 journaled therebetween rearwardly out of engagement with the extension 61 on the scoop 57 through the medium of the bars 72. The scoop is then free to swing forwardly on its pivoted support 58 in a manner to unload the contents thereof and the forwardly swinging movement of said scoop is arrested by the depending lug 80 on the lever 71 which engages in the recess 64 in the rear wall of the scoop. As the machine continues to move forward the bit or entering edge of the scoop will function as a scraper to level the pile of dirt which has been dumped therefrom. When the leveling operation has been completed, the lever 71 is released and is returned to its raised position through the medium of the pull spring 73 which permits the continued rotation of the scoop until the same has returned to its original position. When approaching its original position, the inclined upper surface 63 of the projection or lug 61 engages with the curved extension 66 of the supporting hanger 65 and swings the same rearwardly against the tension of the spring 67 until said projection 61 has cleared the connecting portion of the supporting hanger at which time the spring forces the hanger under the flat underside portion 62 of the projection 61 and the device is ready to be returned to the loading point. It is understood, of course, that when the lever 71 is returned to its raised position, the roller 70 is again shifted to its original position in the path of the projection 61 on the scoop so that the swinging movement of said scoop will be arrested at this point.

Before the point of loading is reached, the operator pushes the lever 24 forwardly until the latch 25 thereon engages in the notch 16 adjacent the forward end of the segmental plate 15 which operation rocks the crank portion 22 of the crank shaft 21 upwardly. This changes the angle of the hitch link 26 in a manner to cause the rear lower corner of the block 27 to engage the adjacent block A and cause the said block 27 to slide upwardly on the link 26 to withdraw the lugs 28 from the uppermost recesses 20 in guide bars 19. The operator then suddenly checks the forward movement of the tractor and the momentum of the machine will force the hitch link to swing downwardly and forwardly until the latch block 27 again engages in the notches adjacent the forward end of the guide bars 19. In this position the scoop is maintained in elevated position above the ground. When the loading point is again reached, the hand lever is shifted rearwardly and crank portion 22 is swung downwardly to again dispose the different elements in the loading position illustrated in the drawings.

It is believed that the many advantages of an excavating scoop and scraper constructed in accordance with this invention will be readily understood, and although the preferred embodiment of the invention is as illustrated and described, it is to be understood that changes in the details of construction may be had which will fall within the scope of the appended claims.

What is claimed is:—

1. An excavating scoop and scraper of the character described comprising a supporting structure mounted on a draft implement, a scoop supporting frame, a hitch link pivotally coupling the frame to the supporting structure, said link adapted to swing in a vertical plane on the supporting structure in a manner to raise and lower the front of the frame and to permit said frame to recede from or approach the draft implement, an axle journaled on the rear portion of the frame having offset spindles, supporting wheels journaled on the spindles, means for rocking the axle for elevating or lowering the rear end portion of the frame when the latter is receding from or approaching the draft implement, a scoop mounted in the frame, and manually operable co-acting means carried by the hitch link and the supporting structure for releasably maintaining said hitch link in raised or lowered position.

2. An excavating scoop and scraper of the character described comprising a supporting structure mounted on a draft implement, a scoop supporting frame, a hitch link pivotally coupling the frame to the supporting structure, said link adapted to swing in a vertical plane on the supporting structure in a manner to raise and lower the front of the frame and to permit said frame to recede from or approach the draft implement, an axle journaled on the rear portion of the frame having offset spindles, supporting wheels journaled on the spindles, means for rocking the axle in a manner to shift the spindles relative to the frame for elevating or lowering the rear end portion of the frame when the latter is receding from or approaching the draft implement, a scoop mounted in the frame, and manually operable co-acting means carried by the hitch link and the supporting structure for releasably maintaining said hitch link in raised or lowered position, said means comprising a pair of spaced parallel longitudinally extending guide bars mounted on the supporting structure and extending on opposite sides of the hitch link and provided with pairs of notches adjacent their opposite ends, a latch block slidably mounted on the hitch link having lugs thereon for engagement with the notches on the guide bars, resilient means for urging the latch block toward the guide bars, a shaft journaled through the guide bars adjacent one end, arms fixed on said shaft on opposite side of the guide bars and engageable with the lugs for lifting the same out of one of the pairs of notches and a manually actuated lever for rocking the shaft in a manner to actuate the arms.

3. An excavating scoop and scraper of the character described comprising a supporting structure mounted on a draft implement, a scoop supporting frame, a hitch link pivotally coupling the frame to the supporting structure, said link adapted to swing in a vertical plane on the supporting structure in a manner to raise and lower the front of the frame and to permit said frame to recede from or approach the draft implement, an axle journaled on the rear portion of the frame having offset spindles, supporting wheels journaled on the spindles, a lever fixed on the axle and extending upwardly therefrom, a rod connecting the free end of the lever with the supporting structure and adapted to rock the axle in a manner to shift the spindles relative to the frame for elevating or lowering the rear end portion of the frame when the latter is receding from or approaching the draft implement and a scoop pivotally mounted in the frame.

4. An excavating scoop and scraper of the character described comprising a supporting structure mounted on a draft implement, a scoop supporting frame, a hitch link pivotally coupling the frame to the supporting structure, said link adapted to swing in a vertical plane on the supporting structure in a manner to raise and lower the front of the frame and to permit said frame to recede from or approach the draft implement, an axle journaled on the rear portion of the frame having offset spindles, supporting wheels journaled on the spindles, a lever fixed on the axle and extending upwardly therefrom, a rod connecting the free end of the lever with the supporting structure and adapted to rock the axle in a manner to shift the spindles relative to the frame for elevating or lowering the rear end portion of the frame when the latter is receding from or approaching the draft implement and a scoop pivotally mounted in the frame, and manually controlled means for maintaining the scoop in an upright or inverted position comprising a pair of supporting bars extending thereover, and mounted on the frame, a protuberance projecting from the rear of the scoop, a supporting hanger pivotally suspended from the bars and engageable under the protuberance for supporting the rear end of the scoop, a keeper pivotally suspended from the bars on the upper side of the protuberance, a lever pivotally mounted on the bars and operatively connected with the keeper for disengaging the same from the protuberance in a manner to permit the rear end of the scoop to swing forwardly and upwardly and a lug mounted on an intermediate portion of the lever for engagement with the scoop for arresting the swinging and maintaining said scoop in a substantially inverted position.

In testimony whereof I affix my signature.

FRED A. GROUNDS.